(12) United States Patent
Da Silva

(10) Patent No.: US 7,161,673 B2
(45) Date of Patent: Jan. 9, 2007

(54) SPECTROMETER COMPRISING ACTIVE MATRIX OPTICS

(75) Inventor: Edouard Da Silva, Lille (FR)

(73) Assignee: Jobin Yvon S.A.S., Longjumeau (FR)

(*) Notice: Subject to any disclaimer, the term of this patent is extended or adjusted under 35 U.S.C. 154(b) by 0 days.

(21) Appl. No.: 10/468,839

(22) PCT Filed: Mar. 1, 2002

(86) PCT No.: PCT/FR02/00764

§ 371 (c)(1),
(2), (4) Date: Mar. 19, 2004

(87) PCT Pub. No.: WO02/071010

PCT Pub. Date: Sep. 12, 2002

(65) Prior Publication Data

US 2004/0169858 A1   Sep. 2, 2004

(30) Foreign Application Priority Data

Mar. 2, 2001 (FR) .................................. 01 02924

(51) Int. Cl.
G01J 3/02 (2006.01)
G01J 3/18 (2006.01)
G01J 3/28 (2006.01)
(52) U.S. Cl. ........................ 356/330; 356/328
(58) Field of Classification Search ............. 356/310, 356/326, 328, 330
See application file for complete search history.

(56) References Cited

U.S. PATENT DOCUMENTS

| 5,504,575 | A | * | 4/1996 | Stafford | 356/330 |
| 5,960,133 | A | | 9/1999 | Tomlinson | |
| 6,128,078 | A | | 10/2000 | Fateley | |
| 6,486,948 | B1 | * | 11/2002 | Zeng | 356/328 |
| 6,859,275 | B1 | * | 2/2005 | Fateley et al. | 356/330 |

FOREIGN PATENT DOCUMENTS

DE   38 05 995   8/1989

* cited by examiner

Primary Examiner—F. L. Evans
(74) Attorney, Agent, or Firm—Arent Fox PLLC

(57) ABSTRACT

The invention relates to a spectrometer (1) comprising a dispersive element of a light beam formed of a set of spectral components, the dispersive element generating spatial dispersion of the spectral components in the form of a dispersion spectrum (6) spatially spread, at least one photon detector (5, 52) comprising at least one detection element (51) being provided at one point of said dispersion. According to the invention, a matrix optical electromechanical device (3) is provided between the dispersive element and the detector in the dispersion spectrum, said electromechanical device being formed of a matrix of optical elements, each of the optical elements being able to send back a portion of the dispersion spectrum according to at least two directions in relation to a control signal, in order to enable the selection of at least one sub-assembly of the spectrum for said detection element. A method and an application of the spectrometer are claimed.

8 Claims, 2 Drawing Sheets

SPECTROMETER COMPRISING ACTIVE MATRIX OPTICS

Figure 1:
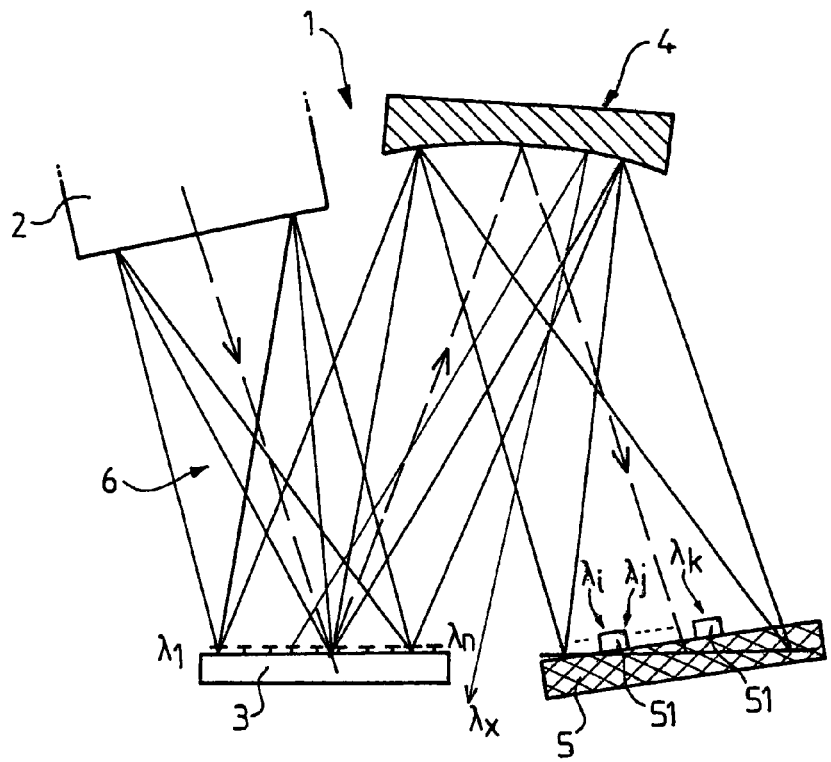

This invention relates to a spectrometer with response adaptable by active matrix optics. It finds applications in the optical spectroscopic instruments wherein a light beam is analysed against its spectral components and, for example, in absorption, diffusion, Raman, fluorescence, phosphorescence, transmission studies.

An optical spectrometer is a measuring instrument intended for selecting and supplying information on the spectral content of a light beam, as regards its wavelength and its frequency. It enables in particular to analyse one or several compounds thanks against their effects on the light as well in transmission as in absorption. The spectrometer includes a dispersive element intended for separating and in spreading in space in the form of a dispersion spectrum the various wavelengths of a light beam. The light beam is indeed composed of photons which are characterised by their vibratory frequency or wavelength. In case when all the photons have the same wavelength, the beam is monochromatic and the spectrum of said beam is simply a line with characteristic wavelength. A light beam may be more complex and include several lines and/or bands.

Spectrometers whereof the dispersive element is a prism or a diffraction grating are known. At the output of the dispersive element is provided a measuring means which is generally a photoelectric device intended for converting the photons into electric signals which may be processed and analysed more readily. Among the photoelectric devices, the following ones are known: photomultipliers, semiconductors or other solid devices, load transfer device (CCD), CMOS, photodiodes, phototransistor, rare earths. Each of these photoelectric devices exhibits advantages and shortcomings in terms of sensitivity, resolution, fastness, cost . . . which justify their being chosen in relation to the applications. The semiconductor or solid devices have in particular the advantage of being realised in the form of matrices comprising a large number of detector elements in a reduced space. These matrix devices also enable to realise high resolution multichannel spectrometers, with high measuring speed over a wavelength range with respect to the devices comprising photomultiplier-type detectors which are rather used in multichannel spectrometers and sometimes even call for additional mechanical devices in order to obtain a spectrum over a certain wavelength range.

Due to their construction and the dispersive means implemented, the spectral spreading obtained is consistent in that the wavelength values are increasing (or decreasing according to the direction) when travelling the space wherein the spectrum is spread and, within the resolution of the system, different wavelengths may not reach a same detection element of a photoelectric device.

Besides, electromicromechanical devices are known which are derived from the manufacturing techniques of integrated circuits and which enable to realise microscopic actuators. In particular, one- or two-dimensional matrices of mirrors or diffraction gratings whereof each of the elements of the matrix may be moved specifically, generally toggled, by an electric signal control. In other electromicromechanical devices, the element may be translated and, in such a case, it is possible to obtain optical effects, for example extinction of the light signal, by interposing interferential phenomena, the translation being, for example, a quarter of a wave. Due to the possible displacement of the mirror or grating, the light beam reaching it may be reflected or refracted according to the directions and hence different space zones in relation to the control signal which may be digital or analogue. In the simplest case, each of the actuators may adopt two different positions in relation to the control signal. In more advanced devices, the actuator may be positioned in more than two different positions and enable thereby more or less complete scanning of the space by the reflected or refracted beam in relation to the control signal which then encodes for these different positions. The electromicromechanical devices are for example implemented in widescreen video projection apparatus and in such a case a two-dimensional type matrix, line x column, is generally employed.

The invention suggests an improvement on the known spectrometers, as well of the single channel as the multichannel type, by implementing such an electromicromechanical component between the dispersive element and the photoelectric measuring device. The components of the spectrum reaching a particular detection element may then be selected actively, regardless whether the components of the spectrum are combined or not, to reach a particular detection element or, conversely, eliminated. It is thus possible to integrate or combine components of the spectrum on a single detection element which may improve the signal/noise ratio and/or the sensitivity of the measurements. The components of the spectrum which are combined or eliminated are selectable at will in relation to the refractive or diffractive element(s) in the matrix of the electromechanical device by electrical control signals.

The invention relates therefore to a spectrometer comprising a dispersive element of a light beam formed of a set of spectral components, the dispersive element generating spatial dispersion of the spectral components in the form of a dispersion spectrum spatially spread, at least one photon detector comprising at least one detection element being provided at one point of said dispersion.

According to the invention, a matrix optical electromechanical device is provided between the dispersive element and the detector in the dispersion spectrum, said electromechanical device being formed of a matrix of optical elements, each of the optical elements being able to send back a portion of the dispersion spectrum according to at least two directions in relation to a control signal, in order to enable the selection of at least one sub-assembly of the spectrum for said detection element.

In various embodiments of the invention, the following means, used on their own or combined according to all the possibilities which may be contemplated technically, are implemented:
  at least one of the directions does not encounter any photon detector and at least one of the other directions encounters at least one detection element,
  the photon detector is a photomultiplier, said detector comprising then a detection element,
  the photon detector is a one- or two-dimensional semiconductor matrix device, said detector comprising then at least one detection element, (it is considered that the semiconductor matrix device also covers a component comprising a single detection element and for example a photodiode)
  the matrix optical electromechanical device is one—or two—dimensional,
  an optical member is provided between the optical electromechanical device and the photon detector, said passive optical member being selected among the diopters, the mirrors, the gratings, the caches comprising an aperture, (the grating is contemplated for example in the case when the filtering of the dispersion spectrum is implemented, the cache is in particular implemented with, but without being limited thereto, the photomultipliers to select a specific spectral line or band in the dispersion spectrum. The member may be active inasmuch as it may be controlled and for example a controlled cache of the liquid-crystal type).

the spectrometer includes in addition to the calculation and control means enabling to select for each of the detection elements at least one line and/or one band of the dispersion spectrum in relation to an automatic or manual programme. (the automatic programme is for example a statistical research algorithm based upon a main component analysis enabling to determine particularly discriminating a measuring configuration, the manual programme is for example the selection by the operator for searching for a particular compound)

The invention also relates to a method for operating a spectrometer according to any of the preceding characteristics which may be combined and wherein a control signal is sent to the optical electromechanical device arranged between the dispersive element and the detector in the dispersion spectrum, said electromechanical device being formed of a matrix of optical elements, each of the optical elements being able to send back a portion of the dispersion spectrum according to at least two directions in relation to a control voltage, in order to enable the selection of a sub-assembly of the spectrum for said detection element.

In a variation of the method, the return direction is modified at a predetermined moment with respect to an event. (In particular, fluorescence or phosphorescence measurements on a compound may be carried out at the determined times with respect to the excitation of said compound, during excitation the detection element not being in the return direction and the optical element being toggled at the end of a predetermined time so that the element lies in the return direction of a portion of the dispersion spectrum. Particularly interesting in the case when a detection element may be <<dazzled>> and/or according to the recovery time and/or response time of the detectors.)

The invention relates finally to an application of the preceding spectrometer at the detection of at least one compound by means of its spectral optical properties.

The term sub-assembly of the spectrum covers the assembly properly speaking, i.e. a detection element may integrate the whole spectrum, all the components of the spectrum reaching said detection element. The term sub-assembly of the spectrum also covers the empty assembly, i.e. a detection element may be made <<blind>>, whereas no component of the spectrum reaches it. Between both these two extremes, a detection element may be led to receive one or several predefined spectral lines or bands. For example, the electromechanical device may be set up so that one detection element receives lines and/or bands corresponding to a particular compound, Al, Cu for example. In case when several compounds should be detected, specific detection elements may be ascribed to each of these compounds where, in case when certain lines or bands should be common, discriminating distribution between the lines and/or bands and the detection elements is implemented. In particular, certain lines and/or bands may be specific for a given compound to be detected and the measurements will only be carried out for these lines and/or bands. On the other hand, another portion of the detection elements may also used as a reference, either generally, or for a particular compound or group of compounds. It is thus possible to provide a spectrometer whereof the operation may be adapted at will in relation to the measuring purpose: conventional spectral analysis, comparative analysis, etc . . .

The term detection element may relate to a single detector, for example a photomultiplier or a single photodiode or a single phototransistor, as well as to an element of a matrix detection component. It is also possible to implement the single-channel or multichannel components within the framework of the invention. Each detection element has an active surface which enables to detect a portion of the spectrum according to the resolution of the device fitted with a dispersive element and detectors, the wavelength of said resolution thus ranging between a few angstroms and several micrometers as the case may be. The term active surface relates to the detector properly speaking as well as a possible association of a detector and of a mask, for example a slot. Thus, in the case of a multichannel spectrometer, several detection elements are implemented for example in the form of a series of independent detectors (photomultipliers or semiconductors . . . ) or of a one—or two—dimensional matrix (semiconductors or others in the form of an integrated circuit). Similarly, the matrix electromechanical device exhibits a resolution linked to the size of each of the reflective or diffractive elements making up said device. According to the respective positions and the optical characteristics of the various components of the adaptive spectrometer, the resolution may vary. In a preferred embodiment, the various components are arranged in order to optimise the resolution at the detection element.

The invention here implements basically a spectrometric adaptable filter, adaptability being programmable by electronic and computer means. Thus, only the spectral lines or bands carrying information and preferably discriminating information may be returned towards one or several detection elements.

Figure 2:
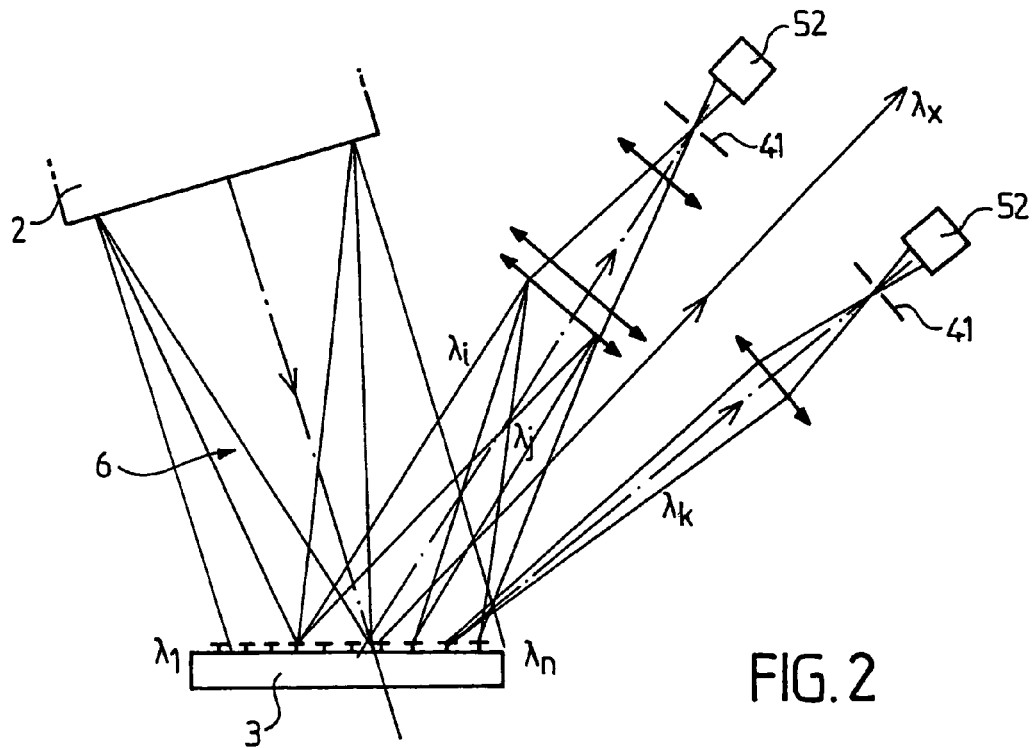
Figure 3:
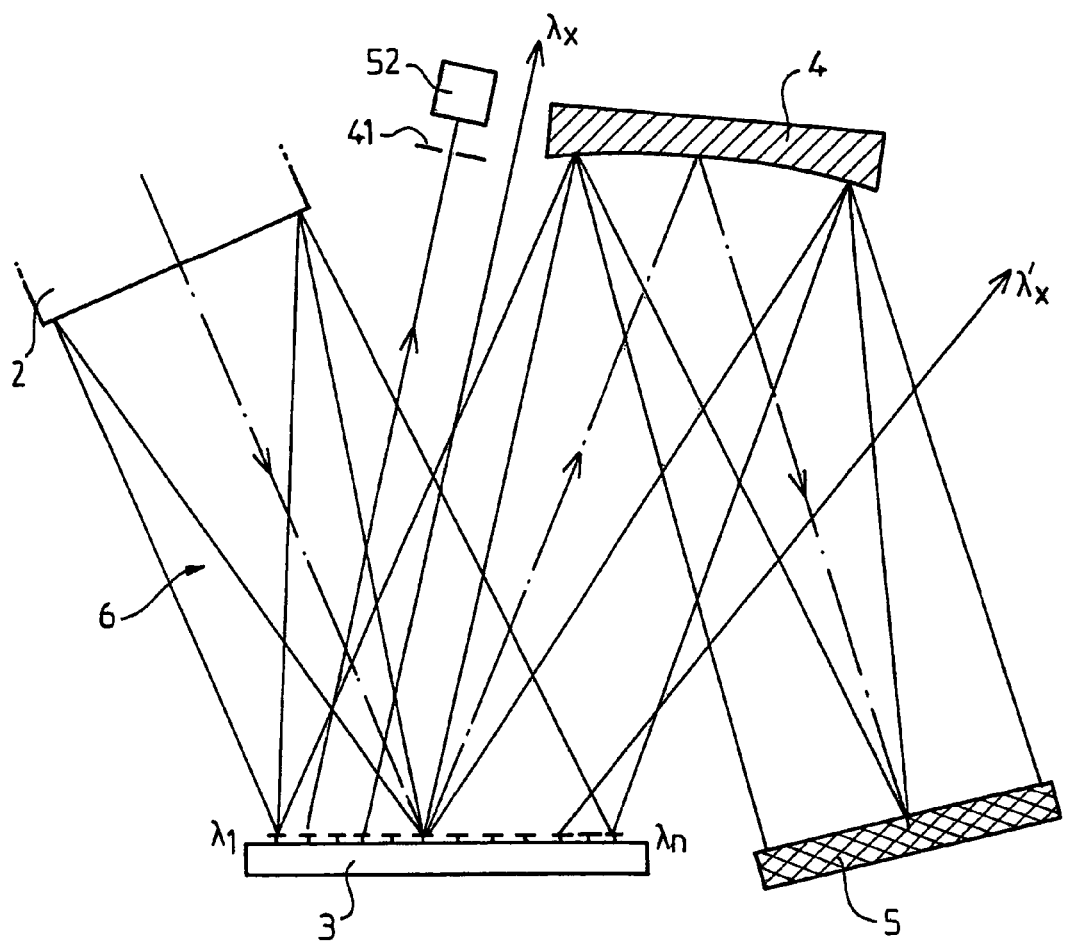

This invention will be understood better by reading the following description of non exhaustive examples for which, FIG. 1 represents a first spectrometer with response adaptable by active matrix optics, FIG. 2 represents a second spectrometer with response adaptable by active matrix optics, FIG. 3 represents a third spectrometer with response adaptable by active matrix optics.

For simplification purposes, the means appended to the invention, and in particular the conventional electronic and computer circuits of the field (acquisition, signal processing, automation, calculation, display, printing the results, etc.) have not been represented on the Figures.

On FIG. 1 the first spectrometer 1 with response adaptable by active matrix optics includes a device 2 enabling to obtain a dispersion spectrum 6 spaced regularly in space as provided by a prism or other conventional spectral dispersive element. The wavelengths $\lambda_1$ to $\lambda_{n-1}$, $\lambda_n$ of the spectrum spaced regularly into incident light beams are received by a matrix electromechanical device 3 comprising at its surface a set of mirrors or gratings, whereas each of them may be displaced by an actuator in relation to an electrical control signal, to send back in at least two directions of the space, as the beam incident reaches the same. Preferably, the same element of the electromechanical device may send back the beam incident in several directions in relation to the control signal so that a same incident beam corresponding to a particular line or band of the dispersion spectrum 6 may be returned in a particular direction of a zone of the space which lay be scanned according to the control signal. At least one detection element 51 of a detector 5 may be provided in a portion or the whole zone of the space. In the example represented, an additional optical device is provided between the detector 5 and the electromechanical device 3. This additional optical device is a return mirror 4. In other applications, the additional optical device may be a combination of dioptres and/or mirrors and/or filters (grating, cache . . . ). The detector 5 here represented is of the matrix type as in the multichannel spectrometers. Whereas each of the return elements of the electromechanical device 3 may be positioned specifically, a same detection element 51 may receive one or several lines or bands $\lambda_i, \lambda_j, \lambda_k$ etc and not necessarily the one which it would have received if, instead of an electromechanical device, a passive return device had been implemented. It is also possible to send back one or several spectral lines or bands $\lambda_x$ ($\lambda'_x$ FIG. 3) in space zones without any element detection. The spectral response is besides adaptable in real time and quickly due to the small size of the optical elements of the electromechanical device and of the capacities of the current electronic calculation and control systems. The term 'control signal' corresponds to a digital or analogue control voltage. A zero voltage may for example correspond to a particular position of the optical element—of its actuator —, and a non-zero voltage correspond to another particular position of the optical element, and hence to various return directions.

More generally, it is contemplated to apply the invention in a similar fashion to a spectrometric apparatus where the detector 5 is replaced or complemented by any other device or application enabling thereby the implementation of the spectrometric adaptable response. It is thus possible to have, thanks to the invention, a real-time adaptable spectrometric filter to select one or several spectral lines or bands. For example, on FIG. 1, the lines or bands $\lambda_x$ ($\lambda'_x$ FIG. 5) may be used downstream, the detector 5 (matrix or not) being then used as a spectral measurement reference.

On FIG. 2, detectors 52 such as those of the multichannel spectrometers, for example photomultipliers, are implemented. An additional optical device 41 of the cache type is also implemented as well as diopters. However, in case when the optical detector exhibits a detection element small enough to provide sufficient resolution, the cache may be omitted. As previously, the spectral lines or bands $\lambda_x$ may be used more downstream and, possibly, the detectors may be omitted. Thus the lines or bands $\lambda_x$ are either rejected or used downstream or returned towards a detection element in another control setup of the electromechanical device. Thus, the dispersion spectrum assembly may be used, or not, according to the programming of the electromechanical device. In particular, a non-useful or non-significant portion of the spectrum may be eliminated in order not to saturate a detection element.

FIG. 3, represents a combination of the previous examples with components, of the single-channel type and of the multichannel type.

In these examples, the number of detectors and detection elements 5, 51, 52 may be irrelevant. However, because of the adaptability of the spectral response, a minimum number of detectors are implemented and for example one of each type in relation to its response characteristics in wavelength and/or in sensitivity and/or speed and/or cost . . .

In these examples, the dispersion spectrum may be in a single dimension or in two dimensions and, similarly, the electromechanical device may be a one- or two-dimensional matrix as well as the matrix detector 5.

As the configuration of the electromechanical device may be controlled in real-time, it is possible to modulate the response of the spectrometer in relation to time or to an external event. It is also possible to specialise the spectrometer for detecting specific compounds, the configuration of the electromechanical device being selected for maximum discrimination, whereas differential analyses may also be realised to separate the contribution of two compounds or more in the spectrum. The analysis may be carried out in transmission as well as in absorption. As mentioned above, the advantages of a multichannel spectrometer may be provided by implementing one or several single-channel detectors.

The invention claimed is:

1. A spectrometer comprising a dispersive element of a light beam formed of a set of spectral components, the dispersive element generating spatial dispersion of the spectral components in the form of a dispersion spectrum spatially spread, at least two photon detectors, each comprising at least one detection element being provided at one point of said dispersion spectrum, wherein a matrix optical electromechanical device is provided between the dispersive element and the at least two photon detectors in the dispersion spectrum, said matrix optical electromechanical device being formed of a matrix of optical elements, each of the optical elements being able to send back a portion of the dispersion spectrum according to at least two directions in relation to a control signal, in order to enable the selection of at least one sub-assembly of the spectrum for each of said detection element, and wherein at least one of the at least two photon detectors is a photomultiplier comprising one detection element and at least one of the at least two photon detectors is a one- or two-dimensional matrix device comprising at least one detection element.

2. A spectrometer according to claim 1, wherein at least one of the directions does not encounter any photon detector, and wherein at least one of the other directions encounters at least one detection element.

3. A spectrometer according to claim 1, wherein the matrix optical electromechanical device is one- or two-dimensional.

4. A spectrometer according to claim 1, wherein a passive optical member is provided between the matrix optical electromechanical device and the at least two photon detectors, said passive optical member being selected among diopters, mirrors, gratings, and caches comprising an aperture.

5. A method for operating a spectrometer according to claim 1, wherein a control voltage is sent to the matrix optical electromechanical device arranged between the dispersive element and the at least two photon detectors in the dispersion spectrum, said electromechanical device being formed of a matrix of optical elements, each of the optical elements being able to send back a portion of the dispersion spectrum according to at least two directions in relation to a control signal, in order to enable the selection of a subassembly of the spectrum for said at least one detection element.

6. A method for operating a spectrometer according to claim 5, wherein the return direction is modified at a predetermined moment with respect to an event.

7. A spectrometer according to claim 1, wherein the at least two photon detectors comprise a matrix detector of one dimension.

8. A spectrometer according to claim 1, wherein the at least two photon detectors comprise a matrix detector of two dimensions.

* * * * *